April 26, 1949.  B. L. EVERING ET AL  2,468,549
HYDROCARBON CONVERSION SYSTEM
Filed Dec. 15, 1941  2 Sheets-Sheet 1

Fig. 1.

Inventors:
Bernard L. Evering
Edmond L. d'Ouville
Donald E. Payne
By
Attorney.

Patented Apr. 26, 1949

2,468,549

UNITED STATES PATENT OFFICE 2,468,549

HYDROCARBON CONVERSION SYSTEM

Bernard L. Evering and Edmond L. d'Ouville, Chicago, Ill., assignors to Standard Oil Company, Chicago, Ill., a corporation of Indiana Application December 15, 1941, Serial No. 422,986

3 Claims. (Cl. 260—683.5)

1

This invention relates to the isomerization of paraffinic hydrocarbons of the light naphtha boiling range by means of an aluminum chloride-hydrocarbon complex in the presence of excess hydrogen chloride and excess hydrogen under pressure. This is a continuation-in-part of our copending application Serial No. 308,480, filed December 9, 1939, now Patent No. 2,443,606, which in turn is a continuation-in-part of our earlier application Serial No. 245,570, filed December 14, 1938 (now U. S. Patent 2,266,012), and is also a continuation-in-part of our copending application Serial 361,022, filed October 14, 1940 (now U. S. Patent 2,300,249).

Other investigators have proposed methods of producing isobutane and higher saturated branched-chain hydrocarbons from straight-chain paraffins using aluminum chloride as the catalyst, but these methods result in such low yields of the desired products based on the catalyst consumed that they are much too expensive for practical use. Aluminum chloride in the presence of hydrogen chloride very readily forms a complex with the hydrocarbons present, and the rapid degradation of this complex to an inactive sludge has been a major factor in the low yields and poor product distribution obtained by prior methods. We have found that excellent yields of the most desirable type of branched-chain saturated hydrocarbons can be obtained from normally liquid straight-chain and slightly branched-chain paraffin hydrocarbons by subjecting them to the action of an aluminum halide catalyst effective in causing the conversion of straight-chain to branched-chain paraffins in the presence of an excess of hydrogen chloride and under a relatively high hydrogen pressure. The hydrogen greatly retards the rate of deactivation of the catalyst, thereby allowing especially high yields of the desired products per unit weight of catalyst and reducing catalyst costs so that the process is economically attractive.

It is an object of our invention to provide a process for the production of branched-chain saturated hydrocarbons, particularly isopentanes and isomerized (particularly neohexane) hexanes, which process is characterized by high yields of the desired isomerization products and low catalyst consumption. Another object is to provide a process whereby light naphthas of low anti- 50

2 knock values are converted into products rich in saturated branched-chain paraffin hydrocarbons of high stability, high knock rating and of volatility suitable for use as airplane fuels or blending agents.

An important object of our invention is to provide a continuous commercial process for converting $C_5$ and $C_6$ saturated straight-chain or slightly branched-chain hydrocarbons into more valuable branched-chain hydrocarbons with minimum degradation of the charge to isobutane and gases and with maximum yields of maximum octane number products per unit weight of catalyst employed. In other words, our object is to so correlate the operating variables such as temperature, pressure, space velocity, catalyst concentration, activator concentration, hydrogen pressure, etc., for a low knock rating $C_5$-$C_6$ paraffinic hydrocarbon charging stock so that at least 25 or 30 gallons of the $C_5$-$C_6$ charging stock may be converted per pound of aluminum chloride employed to give upwards of 98% yields by volume of a gasoline fraction having a CFR-M knock rating at least about 10 to 15 units higher than that of the charging stock. No previous isomerization process of this type has been commercially successful because at least one or more of the operating variables was not within the optimum operating range or was not properly correlated with the remaining operating variables. The object of our invention is to define the optimum operating variables and to correlate said operating variables in such a way as to provide a commercially successful isomerization process.

A further object is to produce a high knock rating blending stock for aviation fuel which can be blended in maximum amounts with commercial isooctane for obtaining an aviation fuel of desired Reid vapor pressure, volatility characteristics, heat content, stability, knock rating, etc. A further object is to provide an improved method and means for introducing materials into the system, recovering products from the system, and utilizing by-product materials obtained in the system.

In the accompanying drawings which form a part of this specification.

In copending application 308,480, our invention is described and claimed as applied to a wide variety of charging stocks including heptane and high end point naphthas. The present invention is specific to the correlation of optimum operating variables for a $C_5$-$C_6$ charging stock, i. e., one which is substantially free from heptane as well as aromatics and which is characterized by an end point within the approximate range of 145 to 180° F., preferably about 152° F. This charging stock will be free of heptane and aromatics by virtue of its boiling range and it should also be substantially free from olefins. In other words, our invention is not applicable to cracked naphthas or other charging stocks containing substantial amounts of olefins unless all but a very small fraction of the olefins are removed therefrom. The feed stock for our process preferably contains about 50% of paraffin hydrocarbons and stocks containing at least 80% paraffin hydrocarbons are especially desirable. It should contain no heptane, certainly less than 10% and preferably less than 5% thereof.

We have found that the optimum correlation of optimum operating conditions for this particular stock is substantially as follows:

Temperature: 200 to 350° F., preferably about 250° F.
Total operating pressure: 500 to 1500, preferably 850 to 900 pounds per square inch.
Fresh aluminum chloride requirement (none recovered): about ½% by weight based on hydrocarbon charge, i. e., about one or two pounds of aluminum chloride per barrel of stock charged.
Hydrogen chloride requirement (including recovered and recycled hydrogen chloride): about 3 to 8%, preferably about 5% by weight based on hydrocarbon charge.
Hydrogen requirement: 100 to 300, preferably about 200 cubic feet per barrel of stock charged.
Space velocity about 1.4 volumes of charging stock per hour per volume of catalyst material in the reactor.

While the materials introduced into our isomerization system are simply charging stock, aluminum chloride, hydrogen chloride and hydrogen, the actual catalyst in the system is an aluminum chloride-hydrocarbon complex. Butane does not form such a complex and while butane may be included in our charging stock our process is primarily for the isomerization of $C_5$ and $C_6$ hydrocarbons and it should not be confused with the very different aluminum chloride process for isomerizing normal butane. The aluminum chloride-hydrocarbon complex when freshly prepared may have a specific gravity as low as about 1.2. On continued use its specific gravity increases to a value within the range of about 1.6 to 2.0, its average specific gravity may be about 1.5. This complex is a fluid which is relatively non-viscous in its fresh state but becomes more and more viscous with continued use. The specific gravity of $C_5$-$C_6$ hydrocarbons is only about 0.66. Therefore, when introduced at the base of a continuous reactor along with hydrogen chloride, the hydrocarbons pass upwardly through the complex as a dispersed phase. If hydrogen is introduced at the top of the reactor a stirrer may be required, but when hydrogen is introduced at the base of the reactor no mechanical stirring means are necessary.

It is difficult in a continuous process of this type to determine the actual time of contact between oil and catalyst. In batch processes the severity of treatment at any temperature is indicated by a "contact factor" which may be expressed as:

(1) $$K = \frac{C}{O} \cdot t$$

where
$C$ = weight of catalyst in reaction zone
$O$ = weight of liquid hydrocarbons in reaction zone, and
$t$ = average time of contact between hydrocarbon feed and catalyst.

In our continuous process it is somewhat more convenient to define the contact factor in terms of liquid feed rate according to the following equation:

(2) $$K = \frac{C}{F}$$

where
$C$ = weight of catalyst in reaction zone, and
$F$ = rate at which liquid hydrocarbons are charged to the reaction zone in weight units per unit time The factor "K" has the dimension of time and will hereinafter be expressed in minutes.

In continuous catalytic processes it is often more convenient to express the severity of treatment at any temperature in terms of space velocity, i. e., the volumes of liquid feed charged per hour to the reactor per volume of catalyst which is retained in the reactor. The space velocity in our system may be ascertained from the above formulae since the specific gravity of the average catalyst complex is about 1.5 and the specific gravity of the charging stock is about .66. Equation 2 thus becomes:

(3) $$K = \frac{C}{F} = \frac{1.5 V_c}{.66 V_0/\min.} = \frac{9 V_c}{4 V_0/\min.}$$

where
$V_c$ is the volume of catalyst complex in the reactor, and
$V_0$ is volume of oil charged to the reactor in corresponding volume units.

Transposing Equation 3 we have:

(4) $$\frac{V_c}{K} = \frac{4}{9} \cdot V_0/\min.$$

Since $V_0/\min.$ is $1/60$ $V_0/hr.$ we have:

(5) $$\frac{V_c}{K} = \frac{4}{9} \cdot \frac{1}{60} \cdot V_0/hr.$$

Transposing Equation 5 we have:

(6) $$\frac{V_0/hr.}{V_c} = \frac{137}{K} = \text{space velocity based on complex}$$

Generally we prefer to base the space velocity on complex since it is the complex which forms the bulk of material in the contacting tower. Based on aluminum chloride (specific gravity 2.44) the space velocity would be $$\frac{222}{K}$$

Thus we may apply data from batch tests, where K (the contact factor in minutes) is easily ascertainable, directly into space velocity. Where the contact factor K is 1 minute the corresponding space velocity is 137 $V_0/hr./V_c$ based on complex or 222 $V_0/hr./V_c$ based on the aluminum chloride content of the complex. Where the contact factor K is 5 minutes the corresponding space velocity is 27 Vo/hr./Vc based on complex or 44 based on the aluminum chloride content of the complex. Where the contact factor is 63 minutes the corresponding space velocity is about 2.2 Vo/hr./Vc based on complex or 3.5 based on aluminum chloride in the complex.

From Equation 6 it will be seen that space velocity varies with the reciprocal of the contact factor, i. e., a minimum contact factor corresponds to a maximum space velocity. The minimum value of the contact factor K that can be employed in carrying out the invention advantageously varies with temperature approximately as indicated by the equation:

(7) $$\text{Log}_{10} K_m = \frac{4883}{460 + T} - 6.417$$

where $K_m$ is a minimum contact factor in minutes at a given temperature, and
T is that temperature in degrees Fahrenheit.

The maximum contact factor in the case of very old catalyst may reach values of the order of one thousand times the minimum but for commercial operations the optimum contact factor is about ten to two hundred, usually about twenty to one hundred times the minimum. The above optimum conditions are for tower reactors; for batch reactors the optimum contact factor may be as low as three times the minimum. Thus Equation 7 gives a minimum value for K at 330° F. of about a half a minute but at such a temperature good results are obtained with relatively fresh catalyst with K values from about five to about eight minutes or more. The following table will illustrate in round numbers the minimum and optimum contact factors and the corresponding optimum space velocities for tower reactors in the temperature range of about 200 to 330° F.

Table I

| Temperature | Minimum K | Optimum K | Maximum Space Velocity | | Optimum Space Velocity | |
|---|---|---|---|---|---|---|
| | | | Complex | AlCl₃ in Complex | Complex | AlCl₃ in Complex |
| | Min. | Min. | | | | |
| 330° F | 0.5 | 5–100 | 273 | 444 | 1.4–27 | 2.2–44 |
| 300° F | 1.0 | 10–200 | 137 | 222 | 0.7–14 | 1.1–22 |
| 250° F | 3.0 | 30–600 | 46 | 74 | 0.23–4.6 | 0.4–7 |
| 200° F | 10 | 100–2000 | 14 | 22 | 0.07–1.4 | 0.1–2 |

From the above table it will be seen that a space velocity of about 1.4 may be used at temperatures from 200 to 330° F. although slightly higher space velocities should be employed in the higher temperature range and slightly lower space velocities in the lower temperature range. In the appended claims the expression "a space velocity of about 1.4 volumes of charging stock per hour per volume of catalyst material in said reaction zone" is hereby defined to be the optimum space velocities substantially as indicated by the above Table I, i. e., said expression is hereby defined to include about 1.4 to 27 at 330° F., .2 to 4.6 at 250° F., .07 to 1.4 at 200° F. and corresponding ranges at other temperatures in the optimum temperature range.

Roughly speaking, this means that for each barrel per hour of stock charged there should be in the general vicinity of about 400 pounds of complex containing about 300 pounds of aluminum chloride in the reactor. The activity of the catalyst tends to decrease with time but is maintained substantially constant by the addition of fresh aluminum chloride and the withdrawal of spent complex from the system. The holding time of the catalyst in the reactor may range from about a week to several months. Only about .1 to 4 pounds, i. e. in the general vicinity of one pound, of aluminum chloride is introduced per barrel of stock charged and for each barrel of stock charged per hour there is about 300 pounds of aluminum chloride in the reactor.

While temperatures of the order of 200 to 350° F. may be employed in our process we have found that the best results are obtainable at temperatures of the order of 250° F. The use of temperatures below 300° F. results in at least three important advantages: First, and most important, the equilibrium octane number in this particular temperature range is considerably higher than at temperatures of the order of 300 to 400° F. which means that we can produce a product having an octane number of about 84 at about 250° F. instead of only about 81 at temperatures of about 330° F. using the most favorable operating conditions for each case. In other words, the reaction is displaced in the direction of the more valuable isomers. The next advantage of the lower temperature range is that cracking is minimized so that there will be less production of gaseous hydrocarbons and a greater yield of liquid products. The third advantage of the low temperature treating range from 200 to 300° F. lies in the fact that catalyst activity is actually longer in this range than at higher temperatures so that less hydrogen need be consumed or so that more conversion may be obtained with an equal amount of hydrogen.

The amount of aluminum chloride employed in our process is vitally dependent upon other operating conditions and particularly upon the hydrogen pressure under which the reaction is effected. Table II illustrates the process carried out under a hydrogen pressure of 600 pounds per square inch for a total run length of 14.78 hours and in the presence of about 3% of hydrogen chloride by weight based on charge. In this run one part by weight of aluminum chloride effected the conversion of 145 parts by weight of charging stock to give a 97.7% yield of an 81 octane number blending stock. The charging stock in this case was a C₅-C₆ paraffinic naphtha having a boiling range of 110–153° F. and having a CFR-M octane number of 67.5. The last column of this table illustrates the continued activity of the catalyst even after long periods on stream, and shows that the catalyst was not spent at the end of the run. When catalyst activity is maintained by adding 1 or 2 pounds of fresh aluminum chloride per barrel of stock charged and withdrawing equivalent amounts of fresh catalyst, the catalyst life or holding time in the reactor is about 1 or 2 weeks.

Table II

| Run 30 | Light Naphtha | AlCl₃ | HCl | Initial H₂ Pressure, Lbs./sq. in. | Temperature | Pressure, Lbs./sq. in. | Reaction Time | Contact factor | H₂ consumed | HCl consumed | Propane produced | Isobutane produced | Liquid Yield | Octane No. (CFR-M) | Increase in O.N. |
|---|---|---|---|---|---|---|---|---|---|---|---|---|---|---|---|
| | Grams | Gms. | Grams | | °F. | | Hours | Min. | Cu. ft. | Grams | | Grams | Per cent | | |
| A | 655 | 70.3 | 20.0 | 600 | 305 | 950 | 0.083 | 0.53 | 0.10 | 8.3 | None | 12.5 | | 79.9 | 12.4 |
| B | 492 | | 13.9 | 600 | 310 | 990 | 0.23 | 1.98 | 0.22 | 5.2 | None | 13.2 | | 82.0 | 14.5 |
| C | 492 | | 13.9 | 600 | 305 | 850 | 0.10 | 0.84 | 0.21 | 2.2 | None | 18.6 | | 79.5 | 12.0 |
| D | 508 | | 13.8 | 600 | 325 | 925 | 0.28 | 2.34 | 0.19 | 2.5 | None | 12.0 | | 82.1 | 14.6 |
| E | 490 | | 13.9 | 600 | 330 | 950 | 0.45 | 3.84 | 0.20 | 0.5 | None | 12.5 | | 79.8 | 12.3 |
| F | 504 | | 13.9 | 600 | 323 | 950 | 0.66 | 5.52 | 0.42 | 1.2 | None | 11.2 | | 81.7 | 14.2 |
| G | 504 | | 13.9 | 600 | 330 | 950 | 0.75 | 6.30 | 0.42 | 2.1 | None | 16.0 | | 81.8 | 14.3 |
| H | 504 | | 13.9 | 600 | 330 | 950 | 0.87 | 7.26 | 0.24 | 3.2 | None | 17.4 | | 81.5 | 14.0 |
| I | 504 | | 13.8 | 600 | 334 | 925 | 0.88 | 7.38 | 0.43 | 1.3 | None | 15.4 | | 80.9 | 13.4 |
| J | 502 | | 13.8 | 600 | 322 | 925 | 0.92 | 7.74 | 0.46 | 1.4 | None | 18.1 | | 80.9 | 13.4 |
| K | 500 | | 13.9 | 600 | 334 | 925 | 0.92 | 7.74 | 0.44 | 1.7 | None | 19.6 | | 80.9 | 13.4 |
| L | 504 | | 13.9 | 600 | 333 | 925 | 0.75 | 6.30 | 0.37 | 1.6 | None | 14.8 | | 80.7 | 13.2 |
| M | 505 | | 13.8 | 600 | 334 | 925 | 1.00 | 8.34 | 0.49 | 0.9 | None | 21.0 | | 81.7 | 14.2 |
| N | 506 | | 13.9 | 600 | 333 | 925 | 0.97 | 8.04 | 0.33 | −0.1 | None | 26.0 | | 82.0 | 14.5 |
| O | 504 | | 13.9 | 600 | 333 | 925 | 0.93 | 7.80 | 0.39 | −0.5 | None | 17.2 | | 80.7 | 13.2 |
| P | 505 | | 13.8 | 600 | 334 | 900 | 1.00 | 8.34 | 0.35 | −0.3 | None | 20.0 | | 80.8 | 13.8 |
| Q | 504 | | 14.0 | 600 | 332 | 925 | 1.00 | 8.34 | 0.33 | −0.3 | None | 18.5 | | 80.9 | 13.4 |
| R | 508 | | 13.8 | 600 | 331 | 925 | 0.97 | 8.04 | 0.43 | −0.1 | None | 19.6 | | 81.0 | 13.5 |
| S | 506 | | 13.8 | 600 | 331 | 925 | 0.97 | 8.10 | 0.40 | 0.2 | None | 16.5 | | 80.9 | 13.4 |
| T | 508 | | 14.0 | 600 | 332 | 925 | 1.00 | 8.28 | 0.44 | 0.2 | None | 23.9 | | 80.6 | 13.1 |
| Totals before correction | 10,205 | 70.3 | 284.6 | | | | 14.78 | | 6.86 | 31.2 | None | 344.0 | 96.0 | 81.0 | 13.5 |
| Corrected Totals | 10,205 | 70.3 | | | | | 14.78 | | 6.86 | 31.2 | 9.0 | 218.6 | 97.7 | 81.0 | 13.5 |
| Average | 512 | | 14.2 | 600 | 330 | 925 | 0.74 | 4.80 | 0.34 | 1.56 | None | 10.9 | 97.7 | 81.0 | 13.5 |

A comparative run on the same charging stock and under substantially the same conditions but in the absence of the hydrogen pressure is illustrated in the top half of Table III. This top portion of the table shows that after only about 9 parts by weight of charging stock were treated with 1 part of aluminum chloride the catalyst effectiveness was reduced by more than 50%. Altogether only 60 parts by weight of charging stock were treated per 1 part by weight of aluminum chloride yet the yield was only 94% and the octane improvement was only 7.4.

A comparative run on substantially the same charging stock and under substantially the same conditions but in the absence of hydrogen chloride is illustrated in the bottom half of Table III. The bottom portion of Table III shows that hydrogen pressure in the absence of hydrogen chloride is even less effective than the use of hydrogen chloride in the absence of hydrogen pressure both from the standpoint of octane number improvement and from the standpoint of catalyst life.

Tables II and III not only show the importance of employing hydrogen pressure as well as hydrogen chloride but they also bring out the surprising fact that hydrogen is consumed when hydrogen chloride is present but it is not appreciably consumed in the absence of hydrogen chloride. We have further demonstrated the fact that hydrogen consumption is much greater in the presence of large amounts of hydrogen chloride than in the presence of small amounts thereof. Thus with 2.8 weight percent of hydrogen chloride based on stock charged the hydrogen consumption is about 70 cubic feet per barrel while with 4.4 weight percent of hydrogen chloride the hydrogen consumption is about 100 cubic feet per barrel, the temperature in both cases being 330° F. Less hydrogen is consumed at low temperatures and pressures than at high temperatures and pressures. We have ascertained that in our preferred operating range the amount of hydrogen charged to the reactor should be within the approximate range of 100 to 300 cubic feet per barrel of stock charged, for example

Table III

| Run 31 | Light Naphtha | AlCl₃ | HCl | Initial H₂ Pressure, Lbs./sq. in. | Temperature | Pressure, Lbs./sq. in. | Reaction Time | Contact factor | H₂ consumed | HCl consumed | Propane produced | Isobutane produced | Liquid Yield | Octane No. (CFR-M) | Increase in O.N. |
|---|---|---|---|---|---|---|---|---|---|---|---|---|---|---|---|
| | Grams | Gms. | Grams | | °F. | | Hours | Min. | Cu. ft. | Grams | | Grams | Per cent | | |
| A | 654 | 70.4 | 20.0 | None | 300 | 300 | 0.133 | 0.86 | None | 12.4 | None | 35.7 | | 80.5 | 13.0 |
| B | 505 | | 13.8 | None | 300 | 300 | 0.15 | 1.25 | None | 1.9 | None | 11.3 | | 73.2 | 5.7 |
| C | 505 | | 13.9 | None | 316 | 330 | 0.33 | 2.79 | None | 0.0 | None | 8.2 | | 71.9 | 4.4 |
| D | 505 | | 13.9 | None | 330 | 350 | 0.33 | 11.2 | None | 0.9 | None | 17.0 | | 74.5 | 7.0 |
| E | 505 | | 14.0 | None | 332 | 380 | 2.50 | 20.9 | None | −0.5 | None | 27.4 | Not determined | 77.2 | 9.7 |
| F | 505 | | 13.9 | None | 332 | 370 | 2.75 | 23.0 | None | −0.2 | None | 19.6 | | 73.9 | 6.4 |
| G | 505 | | 14.0 | None | 330 | 370 | 3.75 | 31.4 | None | 1.3 | None | 18.7 | | 74.5 | 7.0 |
| H | 505 | | 14.0 | None | 332 | 360 | 4.42 | 37.0 | None | 1.8 | None | 13.2 | | 73.4 | 5.9 |
| Total | 4,189 | | 117.5 | None | | | 15.36 | | None | 17.1 | None | 151.1 | 94.2 | 74.9 | 7.4 |
| Average | 523.6 | | 14.4 | None | 330 | 345 | 1.92 | 16.05 | None | 2.1 | None | 18.9 | 94.2 | 74.9 | 7.4 |
| Run Y | | | | | | | | | | | | | | | |
| A | 660 | 72 | | | 600 | 320 | 895 | .083 | .54 | | | None | 10.0 | | 74.8 | 5.4 |
| B | 528 | | | | 600 | 321 | 900 | .25 | 1.64 | | | None | 5.2 | Not determined | 70.6 | 2.1 |
| C | 528 | | | | 600 | 329 | 1,030 | 1.0 | 6.55 | .02 | | None | 7.8 | | 70.7 | 2.2 |
| D | 528 | | | | 600 | 330 | 900 | 2.0 | 13.10 | | | None | 5.9 | | 70.8 | 2.3 |
| Corrected Totals | 2,244 | 72 | | | 600 | 325 | 931 | 3.33 | | | | None | 28.9 | 98.5 | 71.6 | 3.0 |
| Average | 561 | | | | | | | 0.83 | 5.46 | | | None | 7.2 | 98.5 | 71.6 | 3.0 | about 200 cubic feet per barrel of stock charged at a temperature of about 250° F., a pressure of about 850 pounds per square inch and a hydrogen chloride concentration of about 3 to 8% by weight based on stock charged. About 100 to 300, preferably about 200 cubic feet of hydrogen per barrel of stock charged provides the necessary amount for the reaction and also provides the necessary agitation in the reactor so that mechanical stirrers are not necessary.

The hydrogen chloride charged to the reactor may vary from about 3% to about 8% or more based on naphtha charged. The use of the higher concentrations permits the use of somewhat higher space velocities. For example increasing the hydrogen chloride concentration from 2.8 to 4.4% will permit an increase in space velocity of about 40%.

Figure 1:
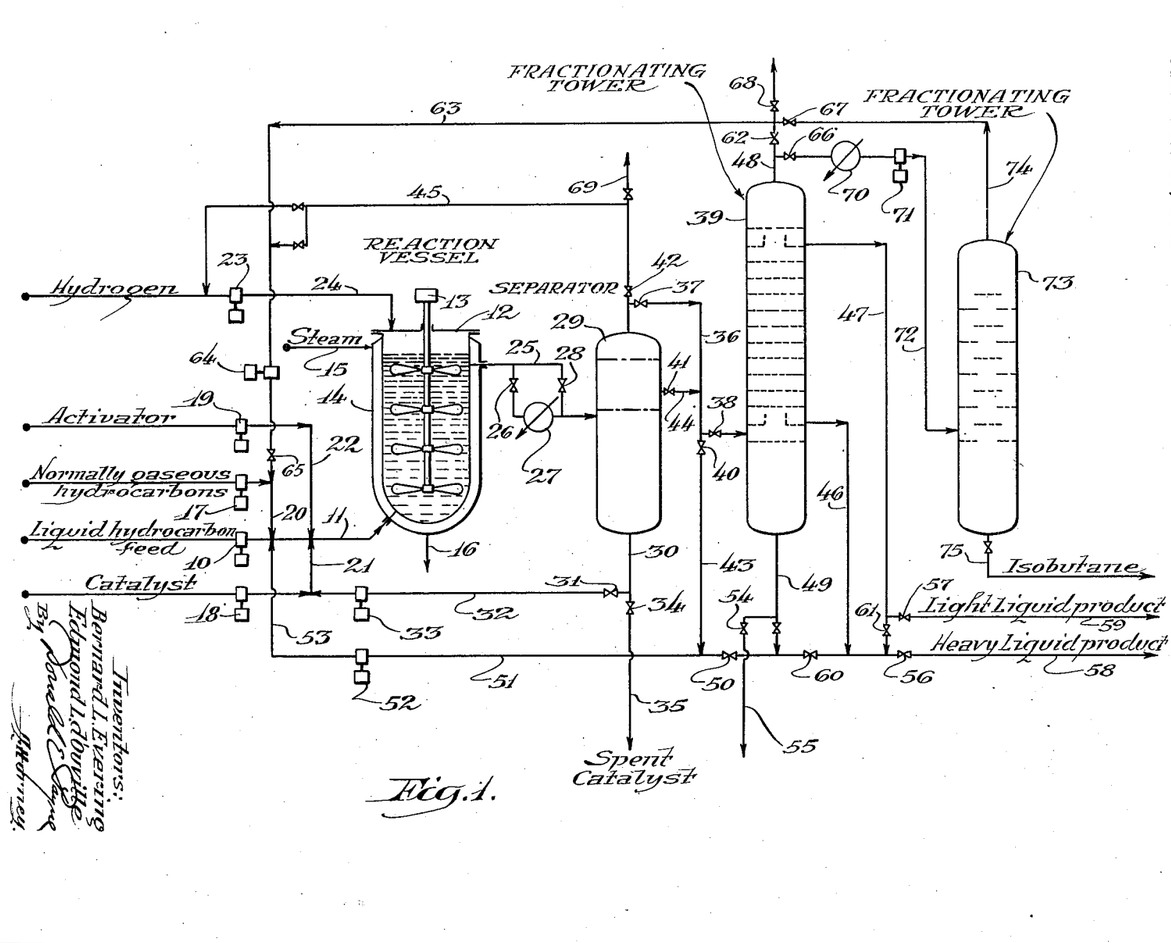
Figure 1 is a schematic diagram of one type of apparatus for practicing the invention.

Our invention will now be described in more detail in connection with the apparatus shown in Figure 1. The normally liquid feed, such as a light, 158° F. end point naphtha containing normal pentanes and hexanes, is introduced into the system by means of pump 10 and line 11 and thence into the lower portion of the reaction vessel 12 which is shown as a jacketed pressure vessel equipped with a stirring device 13 so that the reaction materials are thoroughly contacted. The desired reaction temperature is maintained by passing a suitable gaseous or liquid heating agent through the jacket 14 of reaction vessel 12 by means of inlet 15 and outlet 16. In high temperature operation, saturated hydrocarbon gas consisting predominantly of propane and/or at least one of the butanes, catalyst slurry and activator are introduced into line 11 and mixed with the feed therein by means of pumps 17, 18 and 19, and lines 20, 21 and 22 respectively. When the preferred low temperature operation is employed, pump 17 is not necessarily used. Free hydrogen is supplied to the upper portion of reaction vessel 12 through pump 23 and line 24, and is there maintained at the desired reaction pressure, which is sufficiently high to cause the hydrogen to dissolve in the agitated reaction mixture at a rate at least as great as it is used up in the reaction. Obviously if desired a number of reaction vessels can be used in series or parallel in place of the one shown, or vessels of other types well-known in the art can be substituted therefor.

A portion of the entire reaction mixture is continuously withdrawn from the upper portion of vessel 12 through line 25 and passes either through valve 26 and cooler 27 or through by-pass valve 28 or partly through each valve into separator 29. The products consist of a catalyst complex which settles out in the lower portion of separator 29, and an upper layer consisting of a mixture of hydrocarbons containing branched-chain paraffins having from 4 to 6 carbon atoms per molecule, unreacted feed stock, dissolved hydrogen, HCl and unreacted paraffinic gases if such have been charged. The catalyst complex is continuously withdrawn from separator 29 through line 30 and either recycled to line 21 through valve 31, line 32 and pump 33 or withdrawn from the system through valve 34 and line 35, or under some conditions a portion of the complex may be continuously withdrawn from the system and the remainder recycled. The substantially spent complex can, of course, be regenerated or the aluminum halide recovered therefrom and reintroduced into the system through pump 18. Furthermore, at least a portion of the spent complex can be treated with water or otherwise to furnish hydrogen halide for use as activator in the process.

The upper layer is removed from separator 29 through line 36 and valve 37 and passed through valve 38 into fractionating tower 39, valves 40, 41 and 42 in lines 43, 44 and 45, respectively being closed. Valve 38 is preferably of the pressure-reducing type adjusted to the desired fractionating pressure. Fractionating tower 39 is of a conventional type provided with two sidestream outlets 46 and 47 and is operated so that the bottoms therefrom contain undesirably heavy hydrocarbons, the normally liquid hydrocarbons falling within a desired boiling range are withdrawn through outlets 46 and 47 and gases having less than 5 carbon atoms per molecule are withdrawn overhead through line 48. The heavy liquids collecting at the bottom of fractionator 39 are withdrawn through line 49 and may be recycled to line 11 for further treatment through valve 50, line 51, pump 52, and line 53. Under some conditions it may be desirable to withdraw these heavy liquids from the system and this can be done through valve 54 and line 55.

The sidestreams consisting predominatly of branched-chain paraffin hydrocarbons withdrawn through lines 46 and 47 are sent to storage by means of valves 56 and 57 and lines 58 and 59, respectively, valves 60 and 61 being closed. By thus keeping the desired products separated into relatively light and relatively heavy fractions, their use as blending constituents for motor fuels is facilitated and stabilization if necessary can be carried out only on the light product. However, by closing valve 57 and opening valve 61 the entire product can be withdrawn in a single stream through line 58.

The overhead passing through line 48 consists of excess hydrogen propane, isobutane and possibly some normal butane, and also hydrogen halide and this overhead is preferably recycled to line 20 through valve 62, line 63, pump 64 and valve 65 to inhibit the conversion of the feed into such gases and reduce the quantity of the various gases which must be introduced from outside the system. During this procedure, of course, valves 66 and 67 leading to a further fractionation system, are closed and valve 68 controlling a vent is at least partly closed. In the event impure hydrogen is used the system must be purged of inert gases, either intermittently or continuously, for example, through valve 68 or a valved vent 69 on line 45. If it is desired, however, to recover the isobutane formed during the process, valve 62 is closed and valves 66 and 67 are opened so that the gas stream passes through cooler 70, pump 71 and line 72 into fractionating tower 73 which is operated under such conditions that the liquid bottoms contain the hydrocarbons having 4 carbon atoms per molecule and the overhead which is withdrawn through line 74 and valve 67 for recycling as described consists essentially of propane and hydrogen and also hydrogen halide. The C4 fraction is withdrawn from the bottom of tower 73 through line 75 and consists predominantly of isobutane formed from the liquid feed.

Obviously the overhead passing through line 48 during low temperature operation will contain substantially no propane, and may contain very little isobutane. However, isobutance will be present in considerable quantities if the reaction conditions other than temperature are relatively severe, or if normal butane or isobutane is charged to reaction vessel 12, and it can be separated from the hydrogen and other light gases in fractionating tower 73 as described above.

A variant of the above-described procedure which is often advantageous is carried out by reducing the pressure in separator 29 by manipulation of valves 26 and 28, thus causing a gaseous phase to form therein consisting primarily of hydrogen, hydrogen halide and normally gaseous paraffins. This mixture of gases can be recycled through valve 42 and line 45 to line 63 and pump 64, and/or to the inlet of pump 23, while the upper liquid layer is passed to fractionating tower 39 by means of valve 41 and line 44. One advantage of this arrangement is that the volume of gases in tower 39 and compression costs are reduced, and better fractionation is obtained.

In another type of operation which is advantageous if it is desired to obtain a product having on the average a larger number of side chains and therefore a higher antiknock value, valve 40 is opened during the early stages of a run so that most of the reaction products are recycled through lines 43 and 51, pump 52 and line 53. The branched-chain paraffins upon passing again through the system tend to become more branched in configuration and consequently have a still higher antiknock value. More and more of the products flowing through line 36 are then allowed to pass through valve 38 to the fractionating tower 39 in which these branched-chain hydrocarbons are recovered as described above, a certain percentage of the total products, however, continuing to return through valve 40 to the reaction chamber 12.

Another method of accomplishing substantially the same result consists in opening valves 60 and 50 rather than valve 40 and recycling the relatively heavy sidestream product withdrawn from fractionating tower 39 through line 46 and it may even be desirable in the early stages to recycle the products withdrawn from tower 39 through line 47 by opening valve 61. As in the previous method, however, flow through valve 60 is gradually restricted so that only a part of the products is recycled.

Still another method of operation which is applicable when isobutane is desired as a principal product is to close valve 56 entirely and recycle the entire heavy liquid product to be broken down into isobutane, which action can be facilitated by using relatively large amounts of catalyst and introducing little or no butane or isobutane into the system through pump 17 and line 20. By closing valve 57 and opening valve 61 the light liquid product can be similarly recycled. In this method of operation valve 62 is, of course, kept closed and valves 66 and 67 leading to the isobutane recovery system are open.

Figure 2:
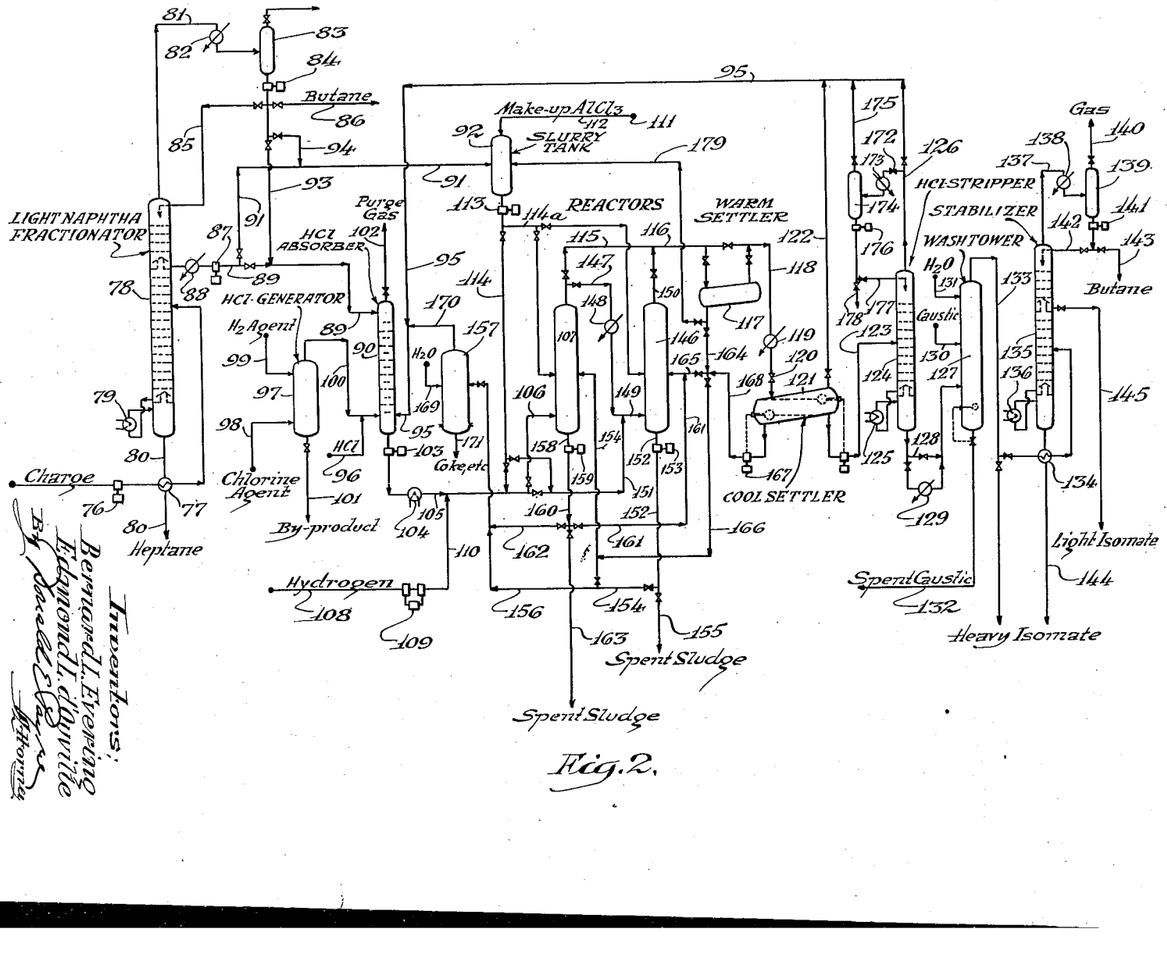
Figure 2 is a flow diagram of a commercial plant for practicing the invention.

In Figure 2 we have shown a commercial design for a 1000 barrel per day isomerization plant. About 5000 barrels per day of light naphtha are charged by pump 76 through heat exchanger 77 to an intermediate point of light naphtha fractionator 78 which may be about 4½ feet in diameter by 50 to 55 feet high. This fractionator is provided with conventional heating means 79 at its base and the fractionator is operated under such conditions that pentanes and hexanes are taken overhead while heptanes and heavier hydrocarbons are withdrawn from the base of the column through line 86. The hexanes, pentanes and any butanes that may be present are taken overhead through line 81, through cooler 82 to reflux drum 83. A portion of the reflux condensate is returned by pump 84 through line 85 to the top of the fractionator to serve as reflux. When a substantially butane-free charging stock is desired, any number of fractionating columns or strippers may be employed to obtain a charging stock consisting of pentane, hexanes, or any desired mixture thereof. In the drawing this is diagrammatically illustrated by the withdrawal of a side stream pump 87 through cooler 88. In this case the rest of the reflux condensate from drum 83 may be withdrawn from the system through line 86. About 90% or more of the side stream from column 78 may be introduced through line 89 to the top of absorber 90 and the rest of the stream may be introduced through line 91 to aluminum chloride slurry tank 92. Usually we prefer to leave any butanes in the charging stock so that the side stream draw-off is unnecessary. Thus in our preferred example, about 900 barrels per day or more of reflux condensate is introduced through line 93 to the top of the absorber and about 100 barrels per day or less of the reflux condensate is introduced through line 94 to slurry tank 92.

The hydrogen chloride required for the reaction is absorbed in the major portion of the feed stock before it is admixed with the aluminum chloride and introduced into the reactor. The hydrogen chloride absorber may be about 1½ feet in diameter by 28 feet high. A stream of hydrogen chloride gases from the system is introduced at the base of this absorber through line 95. Make-up hydrogen chloride may be introduced through line 96 from a pressure cylinder or by means of a compressor. Instead of make-up hydrogen chloride we may employ chlorine, an alkyl chloride or other substance which will supply the necessary halogen halide activator under reaction conditions. We prefer, however, to employ hydrogen chloride and to generate it if necessary in a separate generator.

A hydrogen chloride generator 97 may be of any known type. The chlorine supplying agent introduced through line 98 is preferably chlorine gas although it may be sodium chloride or other halogen containing reagent. The hydrogen supplying agent introduced through line 99 may be hydrogen gas, a hydrocarbon, sulfuric acid, etc. Thus hydrogen and chlorine may be burned in generator 97 to supply hydrogen chloride. Wax tailings or other hydrocarbons may be introduced through line 99 and chlorinated by chlorine gas introduced by line 98 to produce hydrogen chloride and chlorinated hydrocarbons (additional hydrogen chloride may, of course, be obtained from the latter). Sodium chloride may be introduced through line 98 and sulfuric acid through line 99. No invention is claimed in the specific means for generating hydrogen chloride but in our system this hydrogen chloride generator operates under such pressure that no compressors are required for introducing the hydrogen chloride through line 100 to the base of absorber 90 and this hydrogen chloride does not require the purification which is generally necessary even for the production of commercial grades of hydrochloric acid. By-products from the hydrogen chloride generator are withdrawn through line 101. Instead of introducing the make-up hydrogen chloride under pressure directly into absorber 90, we may generate it at about atmospheric pressure, absorb it in all or in a portion of the feed stock at low pressure, and then pump the solution up to the necessary pressure for introduction into absorber 90 or into the reaction chamber.

The hydrogen chloride picked up in absorber 90 should be sufficient to give an amount of hydrogen chloride in the stock entering the reactors within the approximate range of 2% to 10%, preferably about 5%, by weight based on stock charged. From about ½ to about ⅔ or more of this hydrogen chloride is obtained by gases introduced through line 95. Unabsorbed gases such as small amounts of hydrogen, methane, ethane, etc. are purged from the system through line 102, thus eliminating not only gaseous impurities from line 95 but also gaseous impurities from line 100.

The hydrogen chloride rich charging stock from the base of absorber 90 is pumped by pump 103 through heater 104, through lines 105 and 106 to the base of first reactor 107 at a pressure within the approximate range of 500 to 1500 pounds per square inch, perferably 850 or 1000 pounds per square inch. Hydrogen from source 108 is introduced by compressor 109 and line 110 into line 105 in amounts within the approximate range of 100 to 300, preferably about 200 cubic feet per barrel of stock charged to the reactor (the hydrogen being measured under standard conditions). Aluminum chloride from source 111 is introduced through line or hopper 112 into slurry tank 92 at such a rate that the amount of aluminum chloride introduced through line 105 by pump 113 and line 114 is about 1 or 2 pounds per barrel of charging stock introduced therethrough. The stream entering reactor 107 through line 106 is at a temperature within the approximate range of 200° F. to 350° F., preferably about 250° F.

Reactor 107 may be a vertical tower about 5 or 6 feet in diameter by about 18 or 20 feet tall. When the reaction is initiated the major part of this reactor may be filled with an aluminum chloride-hydrocarbon complex the density of which is within the approximate range of 1.3 to 1.7 but which may be maintained at about 1.5 by methods hereinafter described. The charging stock, therefore, passes upwardly through the complex while intimately dispersed therein. Suitable baffle plates or packing may, of course, be employed to prevent channelling. The space velocity under the recited conditions is approximately one-half volume of liquid charging stock per hour per volume of catalyst complex in the reactor. Catalyst complex settles from the upflowing reaction products in the top of the tower and if desired the tower top may be enlarged to provide increased settling area.

We may withdraw the reaction products through line 115 and line 116 to a warm settling chamber 117 which may be a horizontal or slightly inclined drum 3 feet in diameter by about 10 feet long. Liquid from the top of this settler passes by line 118 through cooler 119 and pressure reducing valve 120 so that it enters the cool settling chamber 121 at about 100° F. or less and at a pressure of about 250 pounds per square inch. The cool settler may be a horizontal or slightly inclined drum about 5 or 6 feet in diameter and about 16 feet in length. Released gases leave the top of settler 121 through line 122 which discharges into line 95. Aluminum chloride and catalyst material is thrown out of solution in the cool settler and the clear product liquid is withdrawn from an upper point in this settler through line 123 and introduced into hydrogen chloride stripper 124.

Stripper 124 may be a column about 3 feet in diameter by about 33 feet high and may be provided with heating means 125 at its base. It may be operated with a top temperature within the range of about 100 to 150° F. and a bottom temperature within the range of about 300 to 400° F. The removed hydrogen chloride together with released gases such as hydrogen, methane, ethane, etc. is taken overhead through line 126 to line 95. The liquid from the base of the stripper is introduced at the base of scrubbing tower 127 either directly through line 128 or through a cooler 129.

The scrubber 127 may be a tower about 4 feet in diameter by about 32 feet high and may be provided with suitable baffles, trays or bubble plates for effecting intimate contact of the upflowing products with caustic introduced through line 130 and water introduced through line 131. The product is neutralized in the base of this scrubber and is water washed in the upper part thereof. Spent caustic solution is withdrawn from the base of the scrubber through line 132.

The water washed product passes from the top of scrubber 127 through line 133 and heat exchanger 134 to an intermediate point in stabilizer 135. This stabilizer is provided with conventional heating means 136 at its base. Butanes and any lighter products are taken overhead through line 137, through cooler 138 to reflux drum 139 from which gases may be vented through line 140. Condensed reflux may be returned by pump 141 and line 142 to the top of stabilizer 135. The hydrocarbon stream consisting chiefly of isobutane may be withdrawn from the system through line 143.

If desired, a single isomate fraction may be withdrawn from the base of the stabilizer through line 144. We may, however, withdraw only the heaviest isomate at this point and we may withdraw a light isomate as a side stream through line 145. Here again it should be understood that in actual practice a plurality of columns or towers will be employed for effecting any desired fractionation of isomate. The isomate consists essentially of isohexanes and isopentanes and it may be fractionated to insure the removal of any unconverted hexane or higher boiling products which may be formed and to obtain a product of desired Reid vapor pressure for blending in desired amounts with isooctane to make a super aviation fuel.

Returning to the reaction system we may employ a second reactor 146 of about the same size as the first reactor 107. Products from the first reactor, instead of going to the settler through line 116, may pass through line 147, heat exchanger 148 and line 149 into the base of this second reactor. The operating conditions in the second reactor are substantially the same as in the first reactor although it may be operated at somewhat lower temperature. Products from the top of the second reactor pass through line 150 and line 116 to warm settler 117 as hereinabove described.

Instead of operating the reactors in series they may be operated in parallel by passing only a part of the charging stock through line 106 in the first reactor and by passing the remainder of the charging stock through line 151 and line 149 to the base of the second reactor. By means of this arrangement one reactor may be on-stream while another reactor is standing by for repair or replacement of catalyst complex.

During the course of the reaction the catalyst complex tends to become less active. A substantially constant catalyst activity may be maintained in the reactors by continuously withdrawing a portion of the catalyst from the base of the reactors at about the same rate as additional complex is formed with the aluminum chloride and hydrogen chloride intoduced with the charging stock. Thus catalyst from the second reactor may be withdrawn through line 152 by means of pump 153 and either introduced through line 154 to the first reactor, withdrawn from the system through line 155, or introduced through line 156 to hydrogen chloride recovery drum 157. Catalyst from the base of the first reactor may be withdrawn through line 158 by means of pump 159 and introduced through lines 160 and 161 to the second reactor, or introduced to the hydrogen chloride recovery drum 157 through line 162, or withdrawn from the system through line 163. If the second reactor operates at a lower temperature than the first reactor and in series therewith we prefer to introduce catalyst from the second reactor through line 154 to the first reactor and to remove catalyst through lines 160 and 162 from the first reactor to the hydrogen chloride recovery drum. For such operation we prefer to introduce a part or all of the make-up aluminum chloride slurry from line 114 to the second reactor through line 114a.

Settled catalyst complex from settler 117 is returned through line 164 and either introduced through line 165 to the second reactor or through line 166 to the first reactor. A catalyst slurry from the base of settler 121 is pumped by pump 167 through line 168, either through line 165 to the second reactor or line 166 to the first reactor.

The spent sludge may be either discarded through the system through lines 155 and 163 or utilized in any conventional manner. We prefer, however, to introduce the spent sludge into drum 157 and to add to the sludge in this drum through line 169 a sufficient amount of water or sulfuric acid to effect recovery of the maximum possible amount of anhydrous hydrogen chloride. The recovered hydrogen chloride is returned by line 170 to line 95 and the coke or residue is withdrawn from drum 157 through line 171. If water is employed it should be used in less than stoichiometric amounts in order that the recovered hydrogen chloride be substantially anhydrous; the sludge will thereupon be converted into a cokey mass which may be removed from the drum by hydraulic or any other conventional decoking means. A larger amount of hydrogen chloride may be recovered by the introduction of sulfuric acid through line 169, the sulfuric acid being recovered from the resulting sludge in a conventional acid sludge coker.

The stabilizer 135 may be unnecessary in the system if proper operating conditions are employed for removing $C_4$ and lighter hydrocarbons from the products in hydrogen chloride stripper 124. Thus the overhead from tower 124 may be passed through line 172 and cooler 173 to reflux drum 174 and only the hydrogen chloride and light hydrocarbon gases discharged through line 175 for recycling through line 195. The condensed hydrocarbons, chiefly butanes, may be withdrawn from the base of reflux drum 174 by means of pump 176. A part of these liquefied hydrocarbons are introduced through line 177 to the top of tower 124 in order to provide reflux liquid. Another part of the reflux condensate may be withdrawn from the system through line 178. If the withdrawn fraction is to be employed in an aluminium chloride alkylation process it will be unnecessary to remove any dissolved hydrogen chloride therefrom otherwise this stream may, of course, be neutralized with caustic and washed in a suitable washed tower.

One of the features of our invention is the solution of the hydrogen chloride in at least a major part of the charging stock before this stock is introduced into the reactor. We have found that the solubility of hydrogen chloride in this light naphtha charging stock markedly increases with increase in pressure. Thus at 100° F. and 30 pounds per square inch hydrogen chloride pressure only about 1.5% of hydrogen chloride will dissolve in the liquid feed but at 100° F. and 100 pounds per square inch hydrogen chloride pressure about 5% of hydrogen chloride can be dissolved in said naphtha. At 60° F. and 100 pounds per square inch hydrogen chloride pressure 9 or 10% by weight of hydrogen chloride will dissolve in the light naphtha. At 60° F. and 200 pounds per square inch over 20% of hydrogen chloride will dissolve in the light naphtha. The temperature and pressure in the hydrogen chloride absorber 96 should be such as to effect substantially complete solution of the hydrogen chloride out of the gases which pass through this absorber countercurrent to the upflowing light naphtha stream. We prefer to operate this absorber at a pressure within the approximate range of 50 to 400, preferably about 100 to 300, pounds per square inch and at a temperature readily obtainable by ordinary cooling water, namely, from room temperature to upwards of 100° F.

Once the hydrogen chloride is in solution and this solution is subjected to reaction pressure by pump 103, the bulk of the hydrogen chloride is kept in solution even at reaction temperatures. In fact, 5% of hydrogen chloride will dissolve in the light naptha at a temperature of 250° F. and a pressure of only 200 pounds per square inch.

Instead of introducing the aluminum chloride as a slurry in a part of the charging stock we may introduce it as a slurry solution or fluent stream in previously formed catalyst complex. Thus the complex settled from warm settler 117 may be introduced through line 179 into slurry tank 92 instead of supplying a slurrying liquid to this tank through line 91. The aluminum chloride complex for dissolving or suspending the make-up aluminum chloride may be from any source whatsoever but it is preferably a complex prepared from a light paraffinic hydrocarbon the light isoparaffin complexes being particularly suitable. Complex may be withdrawn from reactor 107 or reactor 146 to serve as a vehicle for introducing make-up aluminum chloride and, in fact, any of the complex or sludge formed in the system may be used for this purpose if it is sufficiently nonviscous. The slurry or solution of aluminum chloride in complex may be made at a slightly higher temperature than the temperature prevailing in the reactor and suitable settling or agitating means may be employed in slurry tank 92 for effecting an intimate mixture of aluminum chloride with the complex. This fluent stream of make-up aluminum chloride in complex may be injected into the reactor by means of suitable pumps or it may simply be introduced by fluid pressure. If gravity head is not sufficient, the pressure may be applied by fluid means such for example as high pressure naphtha or hydrogen. The make-up aluminum chloride may be supplied intermittently instead of continuously.

The plant hereinabove described is designed to convert a 152° F. end point paraffinic light naphtha into approximately 98 volume percent yields of high octane number isomate of approximately the same boiling range. The end point of the total isomate may be somewhat higher than that of the charging stock but the 90° point of the product will be substantially the same as the 90% point of the charge. The lighter ends of the product may be slightly more volatile than the lighter ends of the charge. The Reid vapor pressure of the product may be slightly higher than that of the charge but the difference will not be substantially greater than about two pounds. With a charge of about 69 ASTM octane number the total isomate will have an octane number of about 80 or 81 and if the heavier components of the isomate are removed therefrom by fractionation the remainder will have an ASTM octane number within the approximate range of 85 to 90. 1 cc. of tetraethyl lead will give an increase of about 10 octane number to this product and 3 cc. of tetraethyl lead will give an increase of almost 20 in octane number.

While we have described in detail certain specific examples of our invention it should be understood that the invention is not limited to these specific examples nor to the specific apparatus or operating conditions described in connection therewith. Other types of apparatus, alternative methods of operation and equivalent operating conditions for accomplishing the objects of our invention will be apparent from the above description to those skilled in the art. In this specification and in the accompanying claims, the word "barrel" refers to a barrel of 42 U. S. gallon capacity. The cubic feet of hydrogen refers to the volume of hydrogen measured at 60° F. and 760 millimeters pressure. The word "continuously" includes intermittent as well as uniform addition or withdrawal of materials. Aluminum chloride is intended to include the known aluminum halide equivalents of aluminum halide such as aluminum bromide, etc. Similarly, hydrogen chloride is intended to include equivalent hydrogen halides such as hydrogen bromide. Gas pressures are intended by simple reference to pressure and pounds per square inch. In other words, Applicants' specification is addressed to those skilled in the petroleum refining art and is, therefore, couched in language familiar to those skilled in said art.

We claim:

1. In a process wherein paraffin hydrocarbons containing more than four but less than seven carbon atoms per molecule are isomerized by passage in admixture with hydrogen chloride under isomerization conditions through a reaction zone containing an aluminum chloride isomerization catalyst, and a fixed gas containing hydrogen and hydrogen chloride is separated from the reaction product, the combination of steps which comprises recycling at least a portion of said fixed gas and intimately contacting said recycled fixed gas with said hydrocarbons prior to the introduction of said hydrocarbons into said reaction zone, initially introducing at least a part of said hydrocarbons at an upper part of a hydrogen chloride absorption zone, introducing hydrogen chloride at a lower point of said absorption zone, employing a temperature in the absorption zone in the range of about 60° F. to about 100° F. and a pressure in the absorption zone in the range of about 100 to about 200 pounds per square inch and such as to effect solution of a determinable amount of hydrogen chloride in the absorption zone, and introducing said hydrocarbons with dissolved hydrogen chloride to the reaction zone with a total amount of hydrogen chloride within the range of about 2 to 10% by weight based on total hydrocarbons charged thereto.

2. In a process wherein paraffin hydrocarbons containing more than four but less than seven carbon atoms per molecule are isomerized by passage in admixture with hydrogen chloride under isomerization conditions through a reaction zone containing an aluminum chloride isomerization catalyst, and a fixed gas containing hydrogen and hydrogen chloride is separated from the reaction product, the combination of steps which comprises recycling at least a portion of said fixed gas and contacting said recycled fixed gas with said hydrocarbons prior to the introduction of said hydrocarbons into said reaction zone, initially introducing at least a part of said hydrocarbons at an upper part of a hydrogen chloride absorption zone, introducing hydrogen chloride at a lower part of said absorption zone, employing a pressure in the absorption zone sufficient to maintain hydrocarbons therein in liquid phase and sufficient to effect solution of a determinable amount of hydrogen chloride in the liquid hydrocarbon phase in the absorption zone, and introducing said hydrocarbons with dissolved hydrogen chloride to the reaction zone with a total amount of hydrogen chloride within the range of about 2 to 10% by weight based on total hydrocarbons charged thereto.

3. The process of claim 2 wherein the isomerization conditions include a temperature in the range of about 200° F. to 350° F., a total operating pressure in the range of about 500 to 1500 pounds per square inch gauge and a space velocity of about 1.4 volumes of charging stock per hour per volume of catalyst material in the reactor.

BERNARD L. EVERING.
EDMOND L. d'OUVILLE.

REFERENCES CITED

The following references are of record in the file of this patent:

UNITED STATES PATENTS

| Number | Name | Date |
|---|---|---|
| 2,208,362 | Engel | July 16, 1940 |
| 2,220,091 | Evering et al. | Nov. 5, 1940 |
| 2,250,118 | Smithuysen | July 22, 1942 |
| 2,266,012 | d'Ouville et al. | Dec. 16, 1941 |
| 2,280,710 | Lynch | Apr. 21, 1942 |
| 2,300,249 | Evering et al. | Oct. 27, 1942 |
| 2,314,297 | Watson | Mar. 16, 1943 |

FOREIGN PATENTS

| Number | Country | Date |
|---|---|---|
| 24,044 | India | Aug. 23, 1937 |